United States Patent [19]

Huber

[11] Patent Number: 4,679,895
[45] Date of Patent: Jul. 14, 1987

[54] ADHESIVELESS OPTICAL FIBER CONNECTOR

[75] Inventor: John H. Huber, Harrisburg, Pa.

[73] Assignee: AMP Incorporated, Harrisburg, Pa.

[21] Appl. No.: 645,976

[22] Filed: Aug. 31, 1984

[51] Int. Cl.$^4$ ............................................. G02B 6/36
[52] U.S. Cl. ................................ 350/96.20; 350/96.21
[58] Field of Search ............... 350/96.20, 96.21, 96.22

[56] References Cited

U.S. PATENT DOCUMENTS

| | | | |
|---|---|---|---|
| 3,946,467 | 3/1976 | Lukas et al. | 24/260 |
| 4,167,303 | 9/1979 | Bowen et al. | 350/96.21 |
| 4,190,317 | 2/1980 | Makuch | 350/96.20 |
| 4,236,787 | 12/1980 | Iacono et al. | 350/96.21 |
| 4,354,731 | 10/1982 | Mouissie | 350/96.21 |
| 4,440,471 | 3/1984 | Knowles | 350/96.20 |
| 4,607,911 | 8/1986 | Rhodes | 350/96.20 |
| 4,645,296 | 2/1987 | Cattin et al. | 350/96.21 |
| 4,648,688 | 3/1987 | Ashman et al. | 350/96.21 |

Primary Examiner—William L. Sikes
Assistant Examiner—Brian M. Healy

[57] ABSTRACT

An adhesiveless connector for optical fiber cables is formed by a body having a profiled through passage of inwardly directed threads and a narrow fiber passing bore at the opposite end, a fiber clamp received in the body and having its axial bore, and a clamp insert having exterior threads engaging with the threads of the body and a plurality of cantilever arms which engage the body and fiber clamp to securely grip the fiber and buffer of an optical cable passing therethrough. The termination also includes a cylindrical eyelet which can be used to crimp the cable strength members to the connector.

7 Claims, 5 Drawing Figures

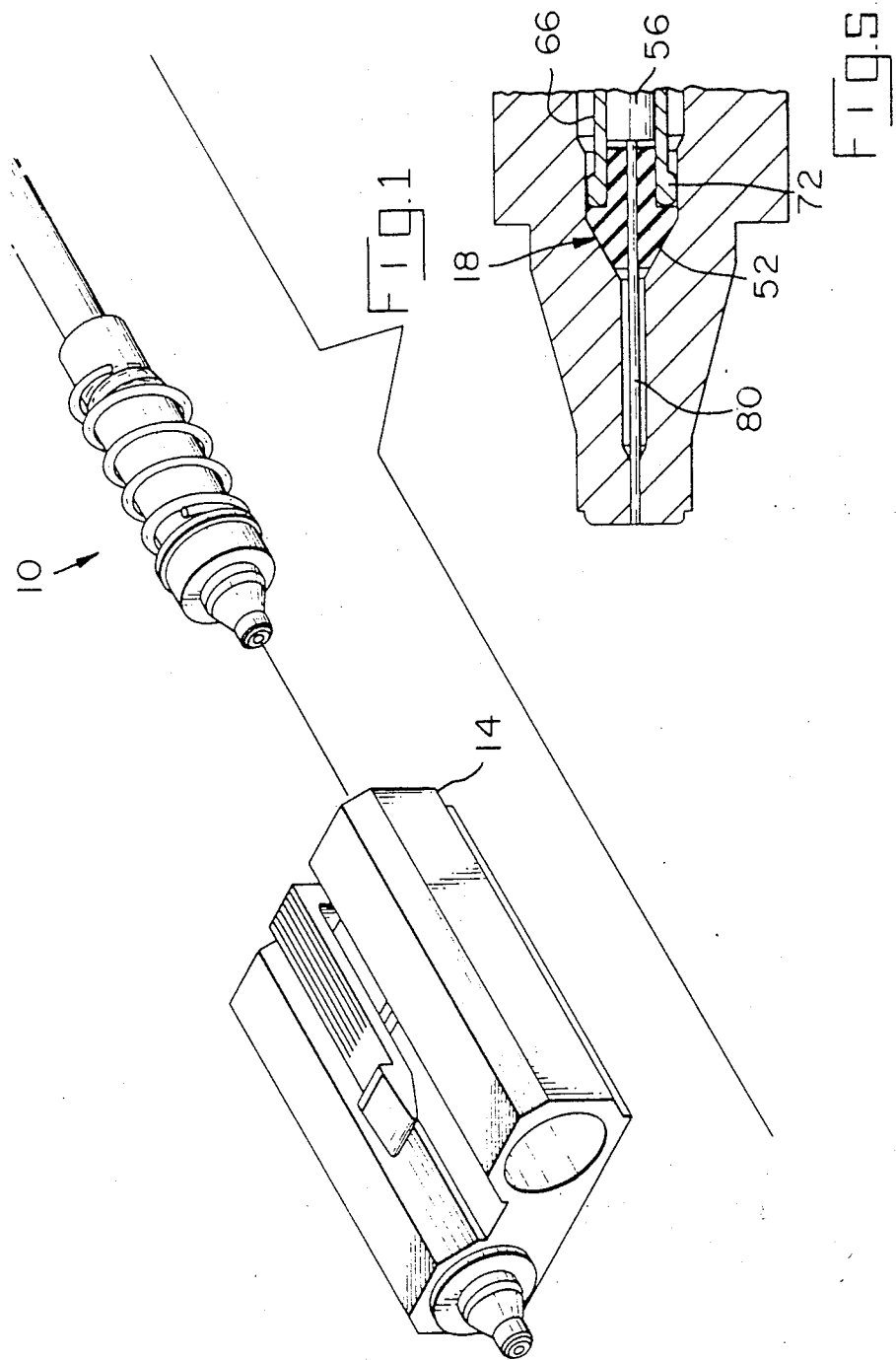

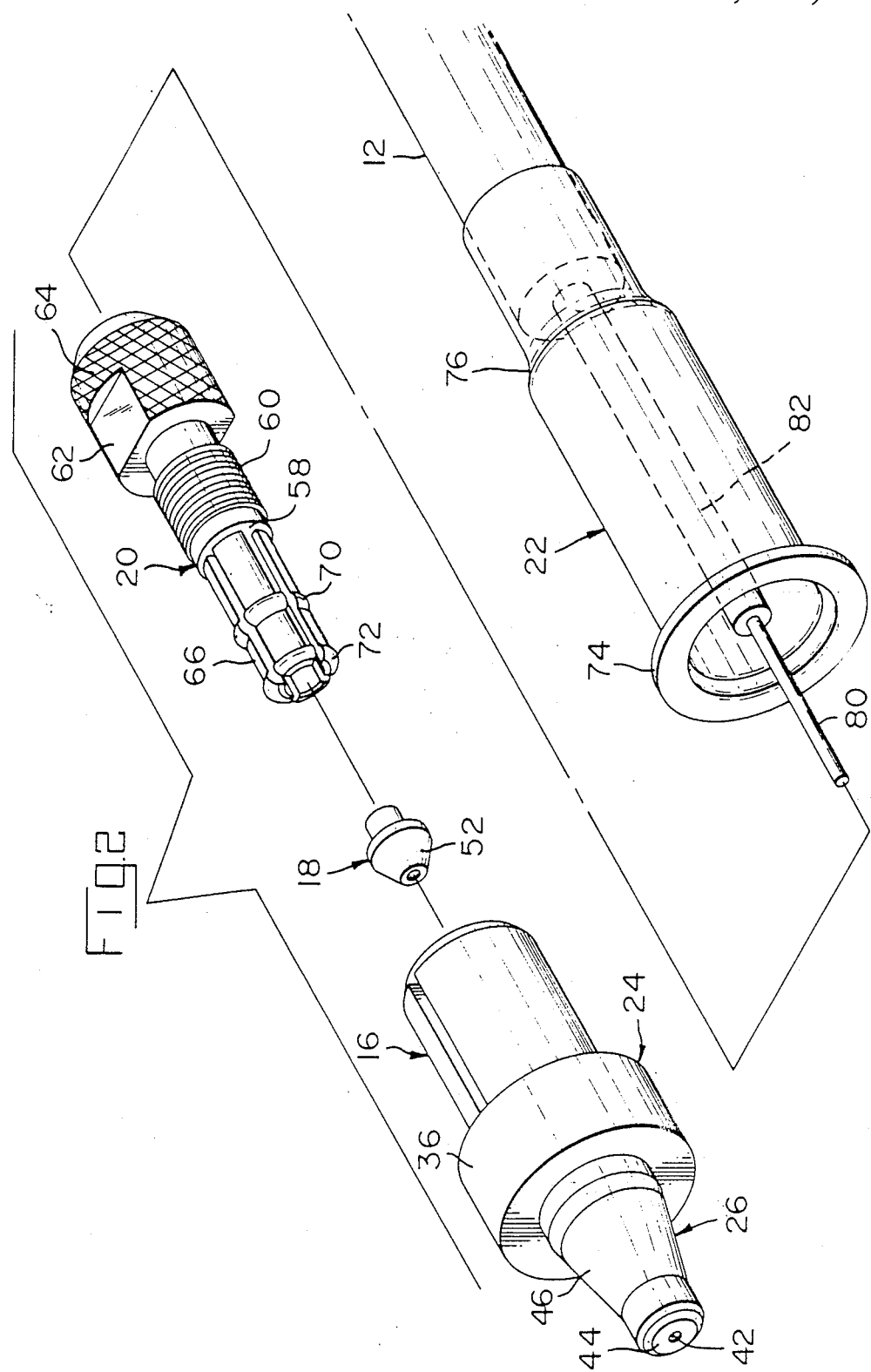

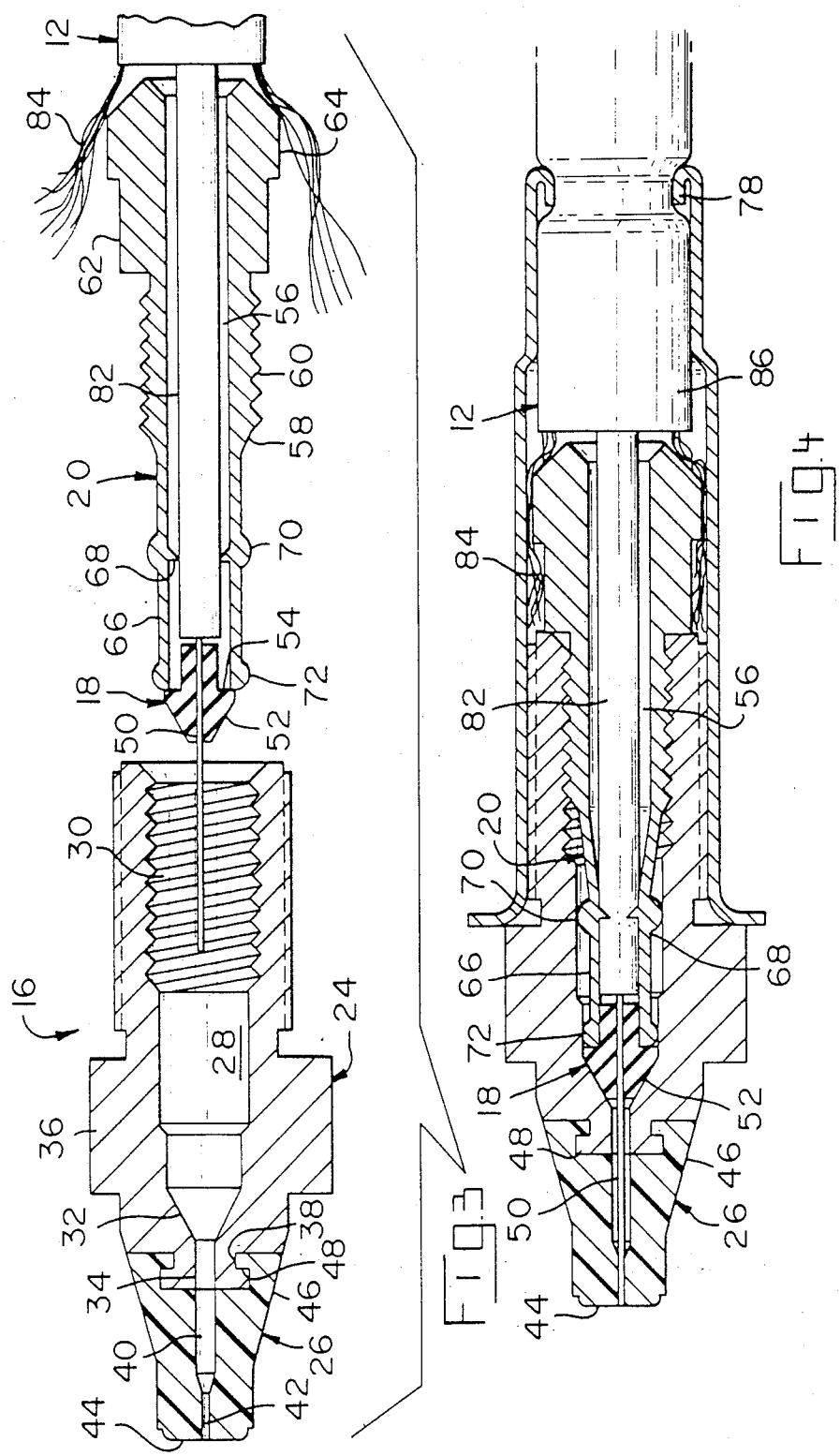

ADHESIVELESS OPTICAL FIBER CONNECTOR

BACKGROUND OF THE INVENTION

The present invention relates to a connector for fiber optic cables and in particular to one which secures the optical fiber by mechanical means obviating the necessity for any adhesive.

It is well known, and almost an industry standard, to use adhesives to secure an optical fiber in a connector. The use of adhesives assures the positioning of the fiber and allows polishing of the end of the fiber without concern for the fiber becoming displaced. However, the inherent disadvantage of this arrangement is that it is rather slow requiring a substantial amount of time for the adhesive to cure before the polishing operation can take place. This frequently means that a connector using adhesives may not be totally satisfactory for field applications because of both the ambient weather conditions and the possible location where the termination is to be effected, for example, at the top of a pole or plenum or in a conduit or manhole.

SUMMARY OF THE INVENTION

It is an object of the present invention to overcome the requirement for adhesives by providing a fiber optic connector which is totally adhesiveless. The subject connector has a ferrule body having a profiled through passage threaded on one end and having a narrow fiber passage at the opposite end, an elastomeric clamping bushing received in the profiled passage, and a clamp insert received in the passage to bias the fiber clamp against the ferrule and to threadingly engage the ferrule securing the fiber, fiber clamp, and insert in place. A tubular eyelet is crimped to the outside of the ferrule to secure cable strength members thereto as well as to engage the cable jacket.

BRIEF DESCRIPTION OF THE DRAWINGS

The present invention will be described by way of example with reference to the accompanying drawings in which:

FIG. 1 is a perspective view of an optical fiber connector employing the ferrule termination of the present invention;

FIG. 2 is an exploded perspective view of the components of the present invention;

FIG. 3 is a partially exploded, partially sectional, view through the termination of the present invention;

FIG. 4 is a section view through the subject connector in a fully assembled and terminated condition; and FIG. 5 is a detail of the nose of a one-piece ferrule of the assembled termination according to the present invention.

DETAILED DESCRIPTION OF THE INVENTION

The subject adhesiveless fiber optic cable termination 10 is shown in FIG. 1 on a cable 12 and aligned to be received in a connector member 14 or of the type disclosed in U.S. Pat. No. 4,167,303, the disclosure of which is incorporated herein by reference.

The details of the present invention will best be understood from FIGS. 2 and 3. The subject termination includes a ferrule 16, a fiber clamp 18, a clamp insert 20, and an eyelet 22. The ferrule 16, as best noted from FIG. 3, is a two-part member having a body 24 and a nose portion 26. The body 24 is preferably made of metal, such as brass, and has a profiled through passage 28 having an internally threaded entry portion 30 and a truncated conical surface 32 leading to an exit passage 34. The outside of the body 24 is profiled with a flange 36 and an annular recess 38. The resilient plastic nose portion 26 has a profiled axial bore 40 aligned with the bore 34 leading to a narrow exit bore 42 at the front mating surface 44. The nose portion 26 also has an outer tapered conical surface 46 and a profiled recess having inwardly directed annular flange 48 which engages the annular recess 38 to secure the nose portion 26 on the body 24.

The fiber clamp 18 is preferably made of an elastomeric material and has an axial bore 50 and an outer profile including a conical tapered surface 52 and an annular shoulder 54. The profile of the conical surface 52 is such that it will interface with the conical surface 32 of the body 24.

The clamp insert 20 is an elongated metal member having a through passage 56 extending through body 58 which has outwardly directed threads 60 intermediate a head portion 62, which has a knurled outer surface 64, and a plurality of cantilever arms 66, which are profiled with inwardly directed buffer clamping teeth 68 and outwardly directed raised clamping rings 70, 72.

The eyelet 22 is a generally cylindrical member of soft metal having an outwardly directed flange 74 at one end, a stepped profile 76 intermediate its ends, and an inwardly turned flange 78 at the second end.

The cable 12 is of standard design having a fiber 80 enclosed within a buffer 82 and supported by strength members 84, such as Kelvar, and enclosed within an outer jacketing 86.

The present invention would be utilized with a standard optical fiber cable 12 by first preparing the cable 12 in known fashion to expose a section of the buffered fiber 82 and the fiber 80. The fiber 80 and the buffered portion 82 would be passed through eyelet 22 and the passage 56 in the clamp insert 20 and the fiber 80 passed through the bore 50 of the fiber clamp 18. This assembly of cable 12, clamp 18 and clamp insert 20 would then be fed into the passage 28 of the ferrule 16 with the fiber 80 passing through passage 34 and bores 40 and 42 to extend beyond the face 44 of the ferrule 16. As this insertion is accomplished, the threads 60 would be engaged with the threads 30 driving the cable 12 forward until the fiber clamp 18 engages the surface 32 to grip down on the fiber 80. This also brings the raised clamping rings 70, 72 into engagement with the profiled portion of the passage 28 to further compress the fiber clamp 18 as well as to drive the buffer clamping teeth 68 into the buffer 82 thereby securely gripping the cable 12. The strength members 84 would then be dressed along the outside of the ferrule 16 and the eyelet 22 brought forward until the flange 74 engages the flange 36. The eyelet 22 would then be crimped to the cable 12 in known fashion as shown in FIG. 4. The details of the gripping of the fiber can be appreciated from FIGS. 4 and 5, which show the interference between the ferrule 16 and fiber clamp 18 as driven by the clamp insert 20 to squeeze and thereby center the fiber 18 with respect to the ferrule.

It will be appreciated by those skilled in the art that the present invention can be utilized in other configurations and that the exterior profile of the ferrule is not critical to the present invention. The present invention is suitable for use with simplex, duplex or multiple fiber connector embodiments. The present invention also may be used in substantially any environment and is quite suitable for use when making field cable repairs.

I claim:

1. A connector for an optical fiber comprises a ferrule for surrounding the fiber, a clamp of resiliently compressible material for surrounding the fiber, and a body for connection to the ferrule, the body having a tubular portion divided into fingers for gripping a buffer jacket surrounding the fiber, characterized in that, a portion of the clamp is surrounded by the fingers, and another portion of the clamp is in the ferrule and is urged by the fingers against an internal surface of the ferrule that deforms the clamp radially to grip the fiber, and the fingers are in the ferrule and are urged by the internal surface to compress radially against the buffer jacket.

2. A connector for an optical fiber as recited in claim 1, wherein the clamp is held by the fingers and a conical portion of the clamp projects outwardly of the fingers to engage the internal surface.

3. A connector for an optical fiber as recited in claim 1, wherein the internal surface includes a truncated conical portion and a conical portion of the clamp projects from the fingers and is urged by the fingers against the truncated conical portion.

4. A connector for an optical fiber as recited in claim 1, wherein the clamp is held by the fingers and the fingers are urged by the internal surface to compress the clamp radially to grip the fiber.

5. A connector for an optical fiber as recited in claim 1, wherein teeth on the fingers project toward the buffer jacket and the fingers are urged by the internal surface toward the buffer jacket to engage the teeth against the buffer jacket.

6. The connector for an optical fiber as recited in claim 1, wherein the ferrule has a rigid portion engaging the clamp and the fingers, and a resilient portion encircling an end of the fiber.

7. A connector for an optical fiber as recited in claim 1, wherein the clamp is held by the fingers, teeth are on the fingers, and the fingers are urged by the internal surface to engage the teeth against the buffer jacket.

* * * * *